United States Patent [19]
Meyer, Jr. et al.

[11] 4,120,916
[45] Oct. 17, 1978

[54] AMORPHOUS AND CRYSTALLINE POLYOLEFIN BASED HOT-MELT ADHESIVE

[75] Inventors: Max F. Meyer, Jr.; Richard L. McConnell, both of Kingsport, Tenn.

[73] Assignee: Eastman Kodak Company, Rochester, N.Y.

[21] Appl. No.: 773,566

[22] Filed: Mar. 2, 1977

[51] Int. Cl.$^2$ .................... C08L 23/12; C08L 23/14
[52] U.S. Cl. .................. 260/897 A; 428/182; 428/355; 428/486
[58] Field of Search ........................ 260/897 A

[56] References Cited

U.S. PATENT DOCUMENTS

| | | | |
|---|---|---|---|
| 2,377,779 | 6/1945 | Hanford et al. | 260/94 |
| 2,396,785 | 3/1946 | Hanford | 260/78 |
| 3,370,106 | 2/1968 | Hall et al. | 260/897 |
| 3,634,546 | 1/1972 | Hagemeyer et al. | 260/876 B |
| 4,022,728 | 5/1977 | Trotter et al. | 260/897 |

Primary Examiner—Carman J. Seccuro
Attorney, Agent, or Firm—Clyde L. Tootle; Daniel B. Reece III

[57] ABSTRACT

The hot melt adhesives of the present invention comprise a blend of polyethylene, amorphous polypropylene and crystalline propylene containing polymer. These hot-melt adhesive compositions have a novel combination of properties such as short hot tack times and open times for the bonding of paraffin-modified corrugated board.

10 Claims, No Drawings

AMORPHOUS AND CRYSTALLINE POLYOLEFIN BASED HOT-MELT ADHESIVE

This invention relates to hot-melt adhesive compositions having a novel combination of properties. More specifically, the invention relates to hot-melt adhesive compositions comprising a blend of polyethylene, amorphous polypropylene and crystalline propylene containing polymer which provide an adhesive having short hot tack times and open times for the bonding of paraffin-modified corrugated board.

Hot-melt adhesives produce a bond by mere cooling as distinguished from crosslinking or other chemical reactions. Prior to heating, the hot-melt adhesives are solids that can be prepared in bulk or pellet form for ease of handling. Upon heating, the hot-melt adhesive composition melts and flows freely for application to a substrate. Since the hot-melt adhesives of the present invention are thermoplastic rather than thermosetting, and thus remeltable, they can be applied to a particular substrate and later remelted to form a hot-melt bond between this substrate and another substrate.

Hot-melt adhesives are useful for bonding various substrates together such as wood, paper, plastics, and textiles, as well as other materials. One use for which they are well suited is the fabrication of corrugated paperboard, and for cardboard case sealing and closing. Hot-melt adhesives useful for producing corrugated paperboard must have high bond strength under conditions of shock, stress, high humidity and extremes of temperature encountered in transportation and storage. In addition, the melt point, wetting time, initial tack, setting time, pot life and general handling qualities on automatic corrugated board machinery are essential considerations.

Hot-melt adhesives are widely used by industry in the construction of various packing containers. For example, fruit, vegetable, poultry, and fish packers have a choice between high burst strength corrugated board (uncoated, paraffin-coated, paraffin-impregnated or paraffin-impregnated and coated) and wooden boxes. The trend in the packaging of fruits, vegetables, poultry, and fish is toward the use of the paraffin-modified corrugated boxes because of their good moisture resistance and low cost. However, paraffin modified corrugated board is difficult to bond with current hot-melt adhesives and the boxes thus formed are not generally suitable for use at elevated temperatures (>90° F). Wooden boxes are too costly and the uncoated corrugated board has poor moisture resistance. Paraffin treated corrugated board is available in three types: (1) paraffin-coated, (2) paraffin-impregnated, and (3) paraffin-impregnated and coated. The degree of difficulty in bonding these modified boards with a hot-melt adhesive increases in the order listed. Pattern waxing is some times used to avoid the problems of bonding to the modified board or the wax is physically removed in the bond area but both of these steps are costly and time consuming.

Attempts have been made to use ethylene-vinyl acetate-based hot-melt adhesives on paraffin-modified corrugated board but they will not bond adequately at elevated temperatures and do not provide adequate bond strength at temperature greater than about 90° F. Above 90° F. wooden boxes have to be used. Air temperatures in the field when packaging fruits and vegetables may range from about 50 to about 105° F. Under these conditions and at box forming rates of about 10-15 boxes per minute, the adhesive must bond and form a fiber tearing bond in about 3 seconds or less. At temperatures slightly above 120° F., the paraffin coating begins to soften and melt and no bonding is possible at such elevated temperatures.

Amorphous polypropylene provides a relatively good bond on paraffin-modified corrugated board if the bonds are aged for about 2 minutes. Such bonds are not fiber tearing when tested at 32° F. and they are relatively weak when tested at 120° F. The long open time of unmodified amorphous polypropylene is also a problem on modern box forming machines. For example, amorphous polypropylene is quite tacky immediately after solidifying from the melt and it remains tacky for at least about 6 minutes. It does not become virtually nontacky until it has aged for about 3 hours. Thus, when amorphous polypropylene is spilled on the box forming mandrel during application of adhesive to the corrugated case flaps, it remains tacky and pulls the box apart before the adhesive has time to set. Therefore, the major deficiencies of amorphous polypropylene in the bonding of paraffin-modified corrugated board include the long open time and long tack time of the polymer as well as the weakness of the bonds at both elevated and low temperatures. It was recently found that blends of amorphous polypropylene with low viscosity polyethylene and crystalline polypropylene provide an unexpected combination if improved low and high temperature properties as well as a very short bonding time. Therefore, it would be an advance in the state of the art to provide polyolefin based hot-melt adhesives that have the properties needed for use in the packaging industry necessary for paraffin coated corrugated board.

In accordance with the present invention, we have found that a blend comprising low density polyethylene, amorphous polypropylene, and crystalline polypropylene or crystalline propylene containing copolymer, provides a hot-melt adhesive having a novel combination of properties. Amorphous polypropylene provides strong, fiber tearing bonds on paraffin modified corrugated board at 73° F. but not at elevated temperatures (>95° F.). Furthermore, amorphous polypropylene remains tacky for a relatively long period of time and requires a long compression time to provide fiber tearing bonds at 73° F. It was found that the addition of about 10% of a low-viscosity crystalline polypropylene reduces the open time of amorphous polypropylene to a very low level; the addition of about 10% of a low-viscosity polyethylene such as Epolene C-16 imparts good bond strength at both low (20° F.) and high temperatures (120° F.). When all three polymer components are present, the blend has a low (desirable) open time (<3 seconds), will provide rapid bonding on paraffin-modified corrugated board over a board temperature range (50°-115° F.), and the bonds obtained are strong over a very broad temperature range (20°-120° F.).

The low density polyethylenes useful in the present invention are well known in the art and can be prepared by the high pressure polymerization of ethylene in the presence of free radical catalysts and have crystalline melting points (Tm) of about 95° to 115° C. These polyethylenes have a melt viscosity at 190° C. of about 100 to about 30,000 cp. and acid numbers of 0 to 60. These polyethylenes have a density of about 0.904 g/cm$^3$ to about 0.940 g/cm$^3$, preferably about 0.904 g/cm$^3$ to about 0.930 g/cm$^3$, and most preferably about 0.906 g/cm³. These polyethylenes can be unmodified polyethylene or polyethylene which has been degraded. Also, these polyethylenes can be degraded polyethylenes which have been oxidized or reacted with maleic anhydride or acrylic acid, for example. These polyethylenes can be used in amounts of about 3 percent to about 20 percent by weight, preferably about 5 percent to about 12 percent by weight.

The amorphous polyolefin useful in this invention is an essentially noncrystalline hexane soluble polyolefin, such as amorphous polypropylene, formed in minor amounts during the production of crystalline polypropylene by the polymerization of propylene in the presence of stereospecific catalysts by a process as disclosed in U.S. Pat. No. 3,679,775, incorporated herein by reference. The solid amorphous polypropylene has a viscosity of about 1,000 to about 50,000 centipoise at 190° C. (ASTM D-1519), and preferably from about 1,500 to about 15,000 centipoise. The amorphous polyolefin can contain crystalline, hexane insoluble polyolefin up to an amount of about 30 weight percent. One such commercially available amorphous polyolefin useful in the present adhesives is the Eastobond M-5 type polyolefins available from Eastman Chemical Products, Inc. The amorphous polypropylene component is contained in the adhesive compositions of this invention in an amount of about 60 percent to about 94 percent by weight and preferably about 76 percent to about 90 percent by weight. The amorphous polyolefin component can also be an amorphous, hexane soluble propylene-alpha-monoolefin copolymer. These amorphous copolymers are formed in varying amounts during the production of crystalline propylene-alpha-monoolefin copolymers by stereospecific polymerization of propylene and a different alpha-monoolefin by a process as disclosed in U.S. Pat. No. 3,529,037, incorporated herein by reference. These amorphous copolymers can also contain various amounts of hexane insoluble polymer up to an amount of about 30 weight percent. These amorphous polymers can also be produced directly, i.e., without production of crystaline copolymer by polymerizing a mixture of propylene and butene-1 or propylene and 1-hexene in mineral spirits at a temperature of about 100° C. to about 180° C. and a pressure in the range of about atmospheric to about 2,000 psig, with the catalyst containing an organopolylithium aluminum compound and the HA or AA forms of titanium trichloride in a mole ratio of 0.01–0.05/0.1–1.0/1 by a polymerization process as disclosed in U.S. Pat. No. 3,679,775 which disclosure is incorporated herein by reference. Methods of preparation of the organopolylithium aluminum compounds are also disclosed in U.S. Pat. No. 3,679,775. One example of amorphous copolymers useful in the present invention is amorphous propylene-butene copolymers containing from about 30 percent to about 75 weight percent of butene-1, and having a melt viscosity of about 100 to 100,000 centipoise at 190° C., a solubility in refluxing hexane of at least 99 weight percent, a solubility in refluxing diethyl ether of at least 60 weight percent, a ring and ball softening point in the range of about 78° to 120° C., and a differential scanning calorimeter melting point nor greater than 120° C. The amorphous polyolefin can be unmodified or amorphous polyolefin reacted with maleic anhydride or acrylic acid, for example, and could be degraded to the desired melt viscosity if one starts with a high molecular weight polymer.

The crystalline, hexane insoluble polypropylenes or propylene containing copolymers useful in the adhesive compositions of this invention are produced by the polymerization of propylene or propylene and ethylene in the presence of stereospecific catalysts. One method for preparing these polypropylenes or propylene containing copolymers is disclosed in U.S. Pat. No. 3,679,775. These polypropylenes or propylene containing copolymers are predominantly crystalline, i.e., hexane insoluble; however, they may contain a small amount of amorphous polymer, i.e., hexane soluble polymer in an amount up to about 10 percent by weight of the crystalline polymer. The crystalline propylene containing copolymers are crystalline ethylene/propylene copolymers containing not more than 20 percent by weight ethylene. These polypropylenes and crystalline propylene containing copolymers have melt viscosities of about 100 to about 100,000 cp. at 190° C. preferably about 250 to about 30,000 cp. at 190° C. The melt viscosities described in this work were determined using a Tenius-Olsen Melt Indexer, using a 2160 g. weight and an 0.0825 inch diameter die at a melt temperature of 190° C. The crystalline, hexane insoluble polypropylenes or propylene containing copolymers can also be unmodified or degraded crystalline polymers which also can be oxidized or reacted with maleic anhydride or acrylic acid, for example. These crystaline polypropylenes and propylene containing copolymers can be used in amounts of about 3 percent to about 20 percent by weight of the adhesive composition, preferably about 5 percent to about 12 percent by weight, and most preferably about 10 percent by weight.

The adhesive compositions of this invention are prepared by blending together the components in the melt at a temperature of about 180° C. to about 230° C. until a homogeneous blend is obtained, approximately 2 hours. Various methods of blending materials of this type are known to the art and any method that produces a homogeneous blend is satisfactory. These components blend easily in the melt and a heated vessel equipped with a stirrer is all that is required. For example, a Cowles stirrer provides an effective mixing means for preparing these hot-melt adhesive compositions.

In addition to the above listed components, it is desirable for the hot-melt adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example Ionox 220 and 330 [tris(di-t-butyl-p-hydroxybenzyl)-trimethylbenzene], Dalpac 4C2 [6-di(t-butyl)-p-cresol], Naugawhite (alkylated bisphenol), Butyl Zimate (zinc dibutyl dithiocarbamate), and Ethyl 702 [4,4'-methylene bis(2,6-di-tert-butylphenol)]. A particularly effective antioxidant is Irganox 1010 which is identified as tetrakis[methylene-3',5'-di-t-butyl-4'-hydroxyphenyl)propionate] methane when used in combination with Cyanox 1212 (American Cyanamid) which is laurylstearyl thiodipropionate.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

199 Grams amorphous polypropylene (melt viscosity = 3000 cp at 190° C., glass transition temperature = −17° C.), 25 grams crystalline thermally degraded polypropylene having a melt viscosity 2100 cp at 190° C., Tm = 155° C., 25 grams polyethylene (melt viscosity 3075 cp at 190° C., Tm = 102° C., crystallization temperature = 86° C, and an acid number of 4), and 0.25 gram Irganox 1010 and 0.87 gram Cyanox 1212 antioxidants are blended in a resin pot at 200° C. with stirring under nitrogen for one hour. These blend has a melt viscosity of 2290 cp at 190° C., melting points of 100° and 155° C. and crystallization temperatures of 100° and 81° C, by differential scanning calorimetry analysis.

A thin film (1-2 mols thick) and molten polymer at 190° C. is spread on a Teflon plate at room temperature. The time the film remains tacky to touch is defined as open time on Teflon. Films of this blend are not tacky to touch after one second.

Test specimens of paraffin-impregnated and coated corrugated board (2 × 5 inches) are folded 180° in the middle of the specimens perpendicular to the direction of the flutes. This configuration provides strong "spring back" forces on the bond immediately after the compression force is released. Bonds are made with this blend at temperatures of 73 and 115° F. The melt temperature of the blend is 190° C. and an open time of ≦0.5 second is used. A compression time of only one second is required to make a bond at 73° F. and only three seconds is required to form a bond at 115° F.

Paraffin-impregnated and coated corrugated board specimens (2 × 6.5 inches) are bonded with this blend at a melt temperature of 190° C., open time of 0.75 second, compression time of 1.0 second and compression force of 40 psig using an adhesive bead width of 70 mils along the entire length of the specimen (6.5 inches). Before the bonding step, the test specimens are cut so that half of the test specimens have the flutes parallel to the long axis and half have the flutes crosswise to the long axis. Thus in each individual bond comprised of two pieces of paraffin-modified board, the flutes are parallel to the long axis in one piece and crosswise to the long axis in the opposite piece. The bonds are aged 24 hours and equilibrated at 30, 73, and at 120° F. for 4 hours before testing by slowly pulling them apart by hand. These bonds provide good bond strength with partial fiber tear at 30° F., are very strong and provide fiber tearing bonds at 73° F. and provide good bond strength with a substantial amount of fiber tear at 120° F.

EXAMPLE 2

The tests described in Example 1 are repeated with unmodified amorphous polypropylene having a melt viscosity of 3000 cp. at 190° C. and a Tg of −17° C. The open time of amorphous polypropylene on Teflon is >60 seconds. The compression time required to bond 2-× 5-inch test specimens folded 180° to provide strong "spring back" force is >16 seconds at 73° F. at an open time of ≦0.5 second. Bonds cannot be formed in this test at a temperature of 115° F. Bonds made at 73° F. (melt temperature 375° F.) in which the specimens are held for two minutes to allow the adhesive to set are strong and fiber tearing when tested at 73° F. However, when tested at 32° F. and 120° F., the bonds are not fiber tearing. This example shows that unmodified amorphous polypropylene is not a useful adhesive for manufacturing paraffin-modified corrugated board cases.

EXAMPLE 3

The procedure of Example 1 is followed except that a blend of 90% amorphous polypropylene having a melt viscosity of 3000 cp. at 190° C. and a Tg of −17° C., 5% polyethylene having a melt viscosity of 3075 cp. at 190° C., Tm of 102° C., Tc of 86° C., and an acid number of 4, and 5% thermally degraded crystalline polypropylene having a melt viscosity of 2100 cp. at 190° C., and a Tm of 155° C. is prepared. The product has a melt viscosity at 190° C. of 2500 cp, provides an open time on Teflon of 2-3 seconds, a tack time to bond specimens folded 180° of 1-2 seconds at 73° F. and 3 seconds at 112° F. Bonds made with this composition at 73° F. are strong, fiber-tearing bonds when tested at 32° F. and strong, fiber-tearing bonds when tested at 120° F.

EXAMPLE 4

The procedure of Example 1 is followed except that a blend of 60% amorphous polypropylene having a melt viscosity of 3000 cp. at 190° C. and a Tg of −17° C., 20% polyethylene having a melt viscosity of 3075 cp. at 190° C., Tm of 102° C., Tc of 86° C., and an acid number of 4, and 20% thermally degraded crystalline polypropylene having a melt viscosity of 2100 cp. at 190° C., and a Tm of 155° C. is prepared. This material has a melt viscosity of 2440 cp at 190° C., an open time on Teflon of 1 second, a tack time of 2 seconds at 73° F. to bond specimens folded 180°, and 4 seconds at 112° F.

EXAMPLE 5

The procedure of Example 1 is followed except that amorphous polypropylene having a melt viscosity of 1500 cp at 190° C. is used. The adhesive properties of this blend are similar to those of the blend described in Example 1.

Similarly good results are obtained when an amorphous polypropylene having a melt viscosity of 4600 cp at 190° C. is used.

EXAMPLE 6

The procedure of Example 1 is followed except that paraffin-coated corrugated board is used in place of the paraffin-impregnated and coated corrugated board. The adhesive properties of the blend on this substrate are similar to those obtained in Example 1.

EXAMPLE 7

The procedure of Example 1 is followed except that paraffin-impregnated corrugated board is used in place of the paraffin-impregnated and coated board. The adhesive properties obtained on this substrate are similar to those obtained in Example 1.

EXAMPLE 8

The procedure of Example 1 is followed except that only 20% degraded crystalline polypropylene having a melt viscosity of 2100 cp. at 190° C., and a Tm of 155° C. is blended with 80% amorphous polypropylene having a melt viscosity of 3000 cp. at 190° C. and a Tg of −17° C. This product provides an open time on Teflon of 10 seconds, a strong bond at 34° F., but essentially no bond at 120° F. This blend provides a tack time of 1 second in the bonding of test specimens folded 180° but the adhesive peeled off of the paraffin coating when tested. This example shows that a bicomponent amorphous polypropylene/crystalline polypropylene blend has inadequate bond strength on the paraffin coated board.

EXAMPLE 9

The procedure of Example 1 is followed except that only 20% polyethylene having a melt viscosity of 3075 cp. at 190° C., Tm of 102° C., Tc of 86° C., and an acid number of 4 is blended with 80% amorphous polypropylene having a melt viscosity of 3000 cp. at 190° C. and a Tg of −17° C. This product provides an open time on Teflon of >60 seconds, a strong bond with partial fiber tear at 34° F. and a weak to fair bond at 120° F. In the bonding of test specimens folded 180° this blend provides a tack time of 1 second and gave good fiber tear when tested. This blend has adequate bond strength on paraffin-modified corrugated board but its open time is too long for satifactory use on a box forming machine.

EXAMPLE 10

The procedure of Example 1 is followed except that a crystalline polypropylene modified by reaction with maleic anhydride and having a melting point of 159° C., melt viscosity of 370 cp. at 190° C. and an acid number of 47 is substituted for thermally degraded crystalline polypropylene having a melt viscosity of 2100 cp. at 190° C., and a Tm of 155° C. Similarly good results are obtained with this substitution in the composition.

EXAMPLE 11

The procedure of Example 1 is followed except that crystalline polypropylene having a melt viscosity of 50,000 cp at 190° C. and a melting point of 162° C. is used. This composition has a melt viscosity at 190° C. of 4000 cp and the adhesive properties of this blend are similar to those of the blend described in Example 1.

EXAMPLE 12

The procedure of Example 1 is followed except that crystalline polyethylene having a melt viscosity at 190° C. of 30,000 cp and a melting point of 100° C. is used. This composition has a melt viscosity at 190° C. of 3600 cp and the adhesive properties of this blend are similar to those of the blend described in Example 1.

Although the invention has been described in considerable detail with particular reference to certain preferred embodiments thereof, variations and modifications can be effected within the spirit and scope of the invention.

We claim:

1. An adhesive composition capable of being used as a hot-melt adhesive comprising a blend of
   (1) 3 to 20 weight percent polyethylene having a melting point of 95° to 115° C., a melt viscosity at 190° C. of about 100 to about 30,000 and a density of about 0.904 g/cm$^3$ to about 0.940 g/cm$^3$, and an acid number of 0 to 60,
   (2) 94 to 60 weight percent of amorphous poly-alph-olefin, and
   (3) 3 to 20 weight percent of at least one member of the group consisting of crystalline polypropylene or crystalline propylene/ethylene copolymers containing not more than 20 percent by weight ethylene having a melt viscosity of about 100 to about 100,000 cp at 190° C.

2. An adhesive composition according to claim 1 wherein said polyethylene has a density of about 0.904 g/cm$^3$ to about 0.930 g/cm$^3$.

3. An adhesive composition according to claim 2 wherein said amorphous poly-alpha-olefin is polypropylene.

4. An adhesive composition according to claim 2 wherein said poly-alpha-olefin is an amorphous propylene/ethylene copolymer containing less than 2 weight percent ethylene.

5. An adhesive composition according to claim 3 wherein said crystalline polypropylene or crystalline propylene/ethylene copolymers containing not more than 20 percent ethylene by weight has a melt viscosity of about 100 to about 100,000 cp at 190° C.

6. An adhesive composition capable of being used as a hot-melt adhesive comprising a blend of
   (1) 5 to 12 weight percent polyethylene having a melt viscosity of about 100 to about 30,000 cp at 190° C. and a density of about 0.904 g/cm$^3$ to about 0.940 g/cm$^3$,
   (2) 90 to 76 weight percent of amorphous poly-alpha-olefin, and
   (3) 5 to 12 weight percent crystalline polypropylene having a melt viscosity of about 100 to about 100,000 cp at 190° C.

7. An adhesive composition according to claim 6 wherein said polyethylene has a density of about 0.904 g/cm$^3$ to about 0.930 g/cm$^3$.

8. An adhesive composition according to claim 7 wherein said amorphous poly-alpha-olefin is polypropylene.

9. An adhesive composition according to claim 7 wherein said poly-alpha-olefin is an amorphous propylene/ethylene copolymer containing less than 2 weight percent ethylene.

10. An adhesive composition according to claim 8 wherein said crystalline polypropylene or crystalline propylene/ethylene copolymers containing not more tha 20 percent ethylene by weight has a melt viscosity of about 100 to about 100,000 cp at 190° C.

* * * * *